(12) United States Patent
Carter, Jr. et al.

(10) Patent No.: US 7,677,492 B1
(45) Date of Patent: Mar. 16, 2010

(54) AUTOMATIC MECHANICAL CONTROL OF ROTOR BLADE COLLECTIVE PITCH

(75) Inventors: Jay W. Carter, Jr., Burkburnett, TX (US); Jeffrey R. Lewis, Wichita Falls, TX (US)

(73) Assignee: Cartercopters, L.L.C., Wichita Falls, TX (US)

( * ) Notice: Subject to any disclaimer, the term of this patent is extended or adjusted under 35 U.S.C. 154(b) by 330 days.

(21) Appl. No.: 11/280,036

(22) Filed: Nov. 16, 2005

Related U.S. Application Data (60) Provisional application No. 60/628,323, filed on Nov. 16, 2004.

(51) Int. Cl.
*B64C 27/00* (2006.01)

(52) U.S. Cl. .............. 244/17.11; 244/17.13; 244/17.25; 244/39

(58) Field of Classification Search .............. 244/17.11, 244/17.13, 17.25, 39, 4 R, 8; 416/44–46, 416/51, 52
See application file for complete search history.

(56) References Cited

U.S. PATENT DOCUMENTS

| | | | | |
|---|---|---|---|---|
| 2,172,333 A * | 9/1939 | Theodorsen et al. | .......... | 416/88 |
| 2,203,012 A * | 6/1940 | Campbell | .................... | 416/26 |
| 2,699,687 A * | 1/1955 | Crandall | .................. | 74/490.11 |
| 2,971,584 A * | 2/1961 | Schon | .......................... | 416/36 |
| 3,108,641 A * | 10/1963 | Taylor | .......................... | 416/18 |
| 3,149,802 A * | 9/1964 | Wigal | ...................... | 244/17.11 |
| 3,575,529 A * | 4/1971 | Bierman | ...................... | 416/27 |
| 3,576,299 A * | 4/1971 | Hanson | ................... | 244/17.19 |
| 3,582,021 A * | 6/1971 | Pender | ........................ | 244/7 A |
| 3,649,132 A * | 3/1972 | Arcidiacono | ................. | 416/18 |
| 3,963,372 A * | 6/1976 | McLain et al. | ................ | 416/30 |
| 4,092,084 A * | 5/1978 | Barltrop | ..................... | 416/102 |
| 4,193,005 A * | 3/1980 | Kos et al. | ....................... | 290/44 |
| 4,195,966 A * | 4/1980 | Cornelius | .................... | 416/18 |
| 4,333,728 A * | 6/1982 | Drees et al. | ............. | 416/134 A |
| 4,507,050 A * | 3/1985 | Jeffery et al. | ............. | 416/90 A |
| 4,523,891 A * | 6/1985 | Schwartz et al. | ......... | 416/157 R |
| 4,571,157 A * | 2/1986 | Eickmann | ................... | 416/158 |
| 4,697,986 A * | 10/1987 | David | .......................... | 416/114 |
| 4,979,698 A * | 12/1990 | Lederman | .................... | 244/7 R |
| 5,222,425 A * | 6/1993 | Davies | ........................ | 91/273 |
| 5,301,900 A * | 4/1994 | Groen et al. | ............. | 244/17.25 |
| 5,304,036 A * | 4/1994 | Groen et al. | ................ | 416/102 |
| 5,364,231 A * | 11/1994 | Eick et al. | ............... | 416/157 R |
| 5,544,844 A * | 8/1996 | Groen et al. | .................... | 244/8 |

(Continued)

OTHER PUBLICATIONS

U.S. Appl. No. 10/782,353, filed Feb. 19, 2004, Carter, Jr.

*Primary Examiner*—Michael R Mansen
*Assistant Examiner*—Philip J Bonzell
(74) *Attorney, Agent, or Firm*—Bracewell & Giuliani LLP (57) ABSTRACT

A rotary aircraft has a fuselage with wings and a rotor. The blades of the rotor are twistable about a pitch axis to vary collective pitch. A collective pitch shaft moves in an advancing direction to increase the collective pitch. Weights are mounted to the blades for outward movement along the blades in response to an increase in rotational speed of the blades. A linkage between each of the weights and the collective pitch shaft moves the collective pitch shaft in the advancing direction in response to an increase in rotational speed. A spring acting through a cam mechanism exerts a non linear force in opposition to the outward movement of the blades.

13 Claims, 5 Drawing Sheets

U.S. PATENT DOCUMENTS

| | | | | |
|---|---|---|---|---|
| 5,727,754 A | * | 3/1998 | Carter, Jr. | ........................ 244/8 |
| 5,853,145 A | | 12/1998 | Carter, Jr. | |
| 6,024,325 A | | 2/2000 | Carter, Jr. | |
| 6,161,799 A | * | 12/2000 | Nyhus | ........................ 244/7 A |
| 6,347,764 B1 | * | 2/2002 | Brandon et al. | ........... 244/17.11 |
| 6,405,980 B1 | * | 6/2002 | Carter, Jr. | .................... 244/230 |
| 6,435,453 B1 | * | 8/2002 | Carter, Jr. | ........................ 244/8 |
| 6,527,515 B2 | | 3/2003 | Carter, Jr. | |
| 2002/0005455 A1 | * | 1/2002 | Carter, Jr. | ........................ 244/8 |

\* cited by examiner

Pitch vs. RPM Mechanical Control - Notional Chart
Figure 5

AUTOMATIC MECHANICAL CONTROL OF ROTOR BLADE COLLECTIVE PITCH

CROSS-REFERENCE TO RELATED APPLICATION

This application claims priority to provisional application Ser. No. 60/628,323, filed Nov. 16, 2004.

FIELD OF THE INVENTION

This invention relates in general to rotor aircraft, and in particular to an apparatus for automatically controlling the collective pitch of rotor blades throughout the flight, from an inertia powered jump takeoff, through high speed high advance ratio (Mu>about 0.7) flight, through a low speed landing approach, to a zero or short roll flare landing.

BACKGROUND OF THE INVENTION

The rotor craft of the type concerned herein is a gyroplane, which has wings, a means of forward thrust other than the rotor, and a rotor. The rotor provides most of the lift during short or vertical takeoffs, slow speed flight, and landings, and the wings provide most of the lift during cruise conditions. For a short or zero roll takeoff, the pilot pre-rotates the rotor to a selected speed. While pre-rotating, the pilot maintains the collective pitch near zero. The collective pitch refers to the angle of attack of the blades relative to the plane of rotation. At zero collective pitch, the leading and trailing edges of the blades are in a common plane with the plane of rotation.

When ready for liftoff, the operator releases the clutch driving the rotor so it freewheels and increases the collective pitch, which tilts the leading edge of each blade upward relative to the trailing edge. The rotor has tip weights to provide high inertia, and the inertia drives the rotor which causes the aircraft to lift while a means of thrust propels the aircraft forward. The operator gradually reduces the collective pitch as the aircraft picks up speed. The operator also decreases the aft tilt of the rotor, which reduces the airstream flowing through the rotor, thus decreasing the rotational speed. At cruising speeds and at an advance ratio greater than about 0.7, the collective pitch is generally between 1.5 and minus 0.5 degrees, and the rotor provides very little of the lift. The airstream flowing through the rotor causes the rotor to auto-rotate at a selected slow rotational speed.

When landing, the operator tilts the rotor aft, which causes the rotor to speed up. The operator also increases the collective pitch, causing the rotor to assume more of the lift required for the aircraft.

Flying a gyroplane as described requires the operator to adjust the collective pitch from near zero, during pre-rotation, to a high level for takeoff and landing, and again to between 1.5 and minus 0.5 degrees at cruising speeds. Some skill must be acquired in order to properly adjust the collective pitch and the operator must remain aware of the necessity of making the pitch changes.

SUMMARY OF THE INVENTION

In this invention, a pitch controller automatically adjusts the collective pitch for the pilot. The collective pitch is varied at a given desired relationship to the speed of rotation of the rotor blade, except during pre-rotation. The pitch controller is mounted to the rotor for rotation therewith and operatively coupled to a collective pitch member that moves to vary the collective pitch. The pitch controller applies a force to the collective pitch member that varies in response to RPM and centrifugal force created by the rotor. A lockout member selectively prevents movement of the collective pitch member while the rotor is pre-rotating prior to takeoff.

The pitch controller preferably includes collective pitch weights that are carried on slides in the rotor blades. Each pitch weight moves along the length of the blade in response to the centrifugal force, and thus the rotational speed of the rotor. A cable or link attaches each pitch weight to an arm on the pitch member. The cable passes around a pulley (or a link through a bellcrank) enroute to the arm so that an outward pull on the cable/link creates a downward movement of the collective pitch member.

There are a number of forces/moments acting on the blades to vary its pitch, such as a moment required to twist the spar due to its torsional stiffness, a moment due to centrifugal force which tries to untwist the spar, a moment due to centrifugal force which tries to drive the blade weight to the rotor plane of rotation, a moment due to varying rotor lift which may or may not pass through the blade feathering axis, and a moment due to the rotor pitch weight. In order to provide a net moment to drive the blade to the desired pitch vs RPM (the rotor RPM is controlled by a separate controller), a spring acting to drive the blade in the direction to reduce blade pitch and acting across a bellcrank or cam, so its force can be varied non linearly vs blade pitch, is also required.

DETAILED DESCRIPTION OF THE INVENTION

Figure 1:
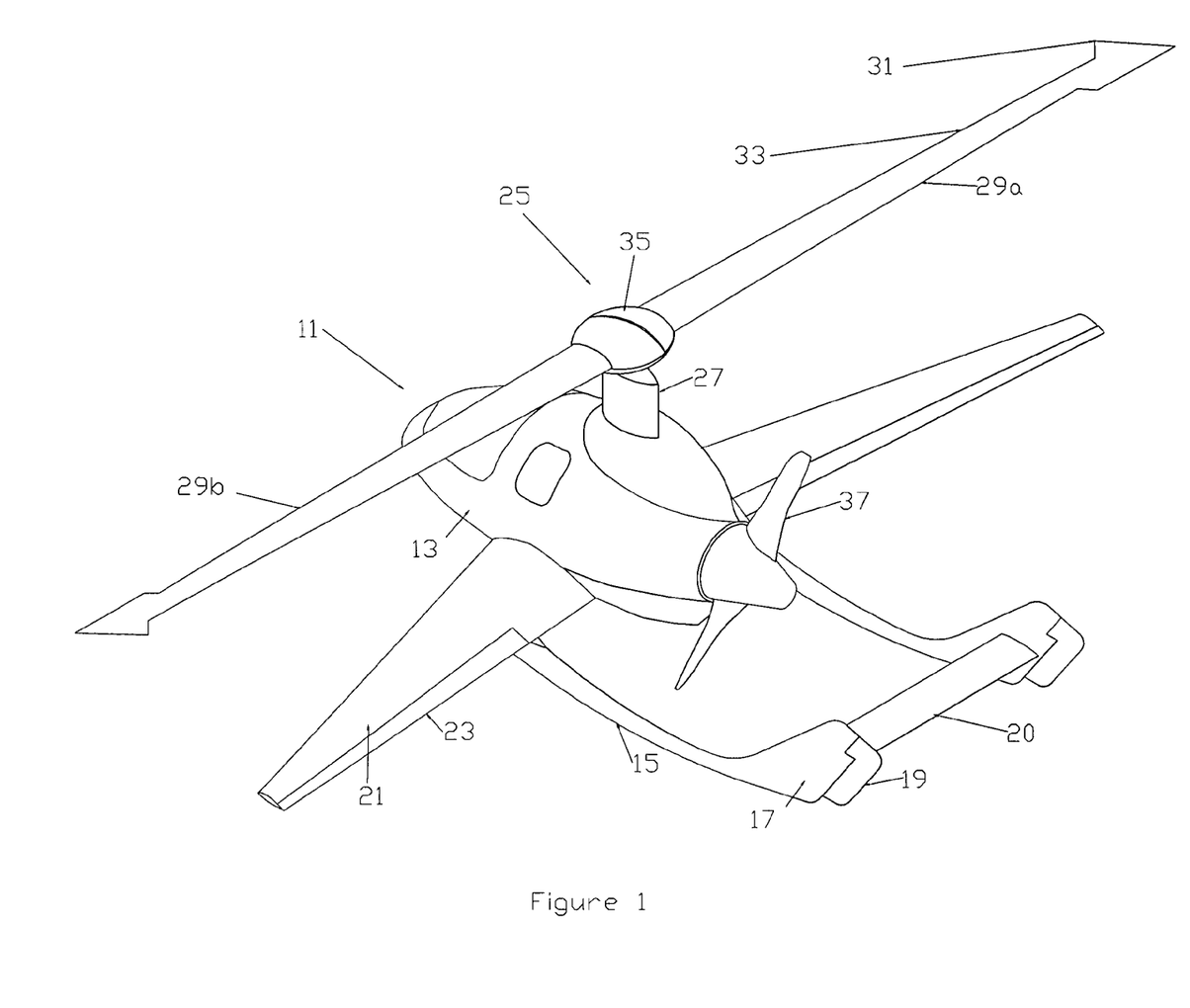
FIG. 1 is a perspective view illustrating a rotor aircraft constructed in accordance with this invention.

Referring to FIG. 1, aircraft 11 is gyroplane having a fuselage 13 with tail booms 15 in this example. A vertical stabilizer 17 is located at the end of each tail boom 15. A rudder 19 is mounted to the aft end of each stabilizer 17. A movable elevator 20 extends between tail booms 15 at vertical stabilizers 17.

Fuselage 13 has a pair of wings 21 that provide lift for cruise conditions. Each wing 21 has an aileron 23 in this embodiment. A rotor 25 is mounted above fuselage 13 on a mast 27. Rotor 25 is shown with two blades 29, but it could have more than two. During each revolution, one blade 29a becomes the advancing blade while the other blade 29b becomes the retreating blade. Blades 29 have tip weights 31 at their tips for providing inertia during pre-rotation. Preferably tip weights 31 are forward of the leading edge 33 of each blade 29. Blades 29 join each other at a hub 35 at the upper end of mast 27. Preferably hub 35 is split into two halves movable relative to each other. Aircraft 11 has an engine (not shown) that powers rotor 25 for pre-rotation prior to takeoff. The engine also powers a propeller 37, which is shown as a pusher propeller but could also be a tractor-type. Alternately, forward propulsion and rotation of rotor 25 could be provided by a jet engine.

Figure 2:
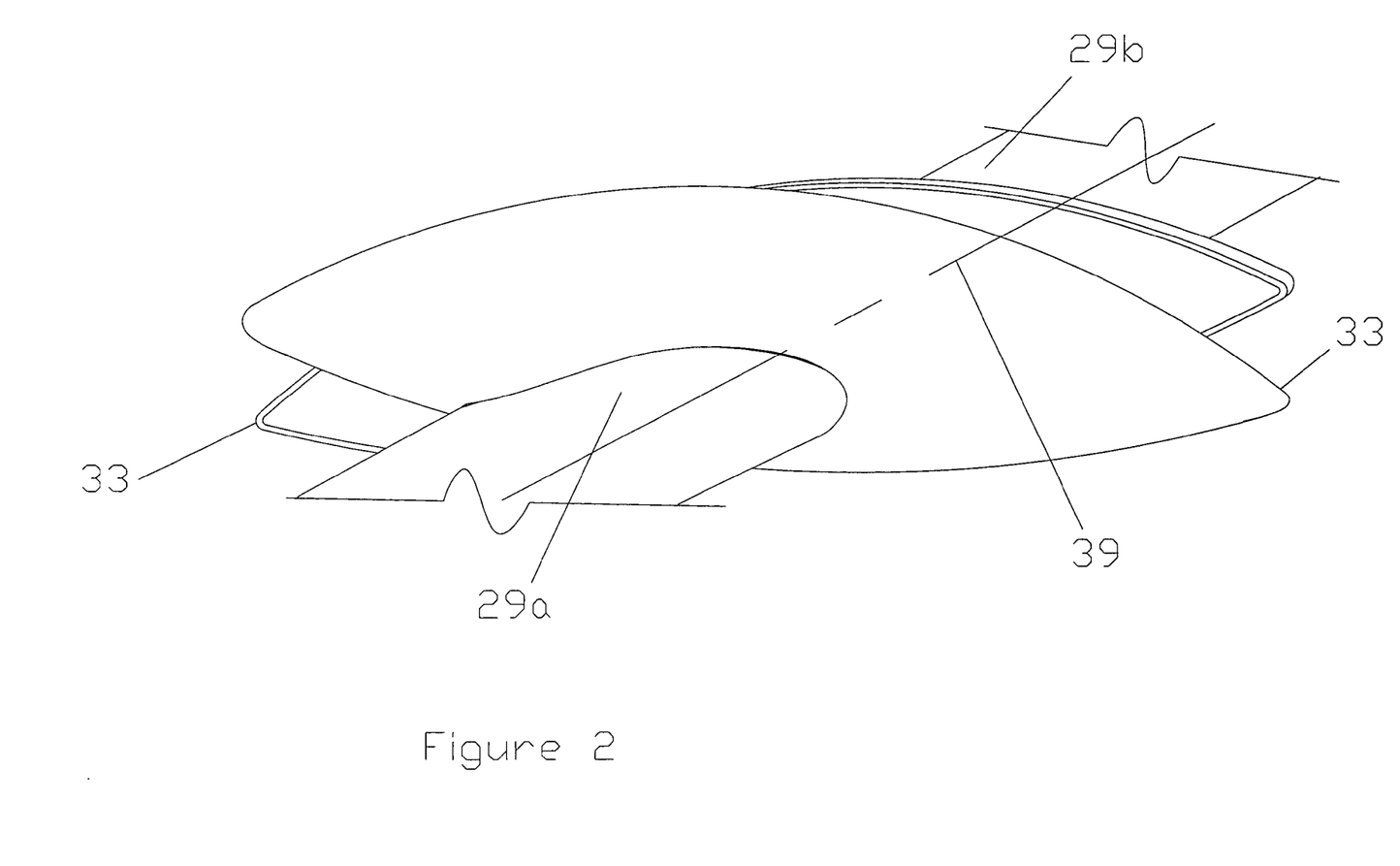
FIG. 2 is a schematic sectional view of one of the blades of the rotor of FIG. 1, shown in an increased pitch position and showing the other blade with dotted lines.

Referring to FIG. 2, blades 29 are movable relative to each other about a pitch axis 39 to vary the collective pitch. In the position shown in FIG. 2, each leading edge 33 of blades 29 tilts upward or twists about pitch axis 39 to increase the pitch collective. An increase in collective pitch increases the angle of attack. If rotated or twisted about pitch axis 39 in the opposite direction, leading edge 33 will move downward to the plane of rotation. Rotor 25 produces greater lift when the pitch is at a high level, as shown in FIG. 2, than when the collective pitch is at a lesser level or zero. Aircraft 11 (FIG. 1) is designed so that at takeoff and landing, rotor 25 produces the lift, but at cruise flight, rotor 25 will produce very little of the lift, rather the lift will be provided by wings 21. Collective pitch is thus adjusted from the high positive level shown in FIG. 2 to between about 1.5 and minus 0.5 degrees at high speed cruise speeds (advance ratio>about 0.7).

Figure 3:
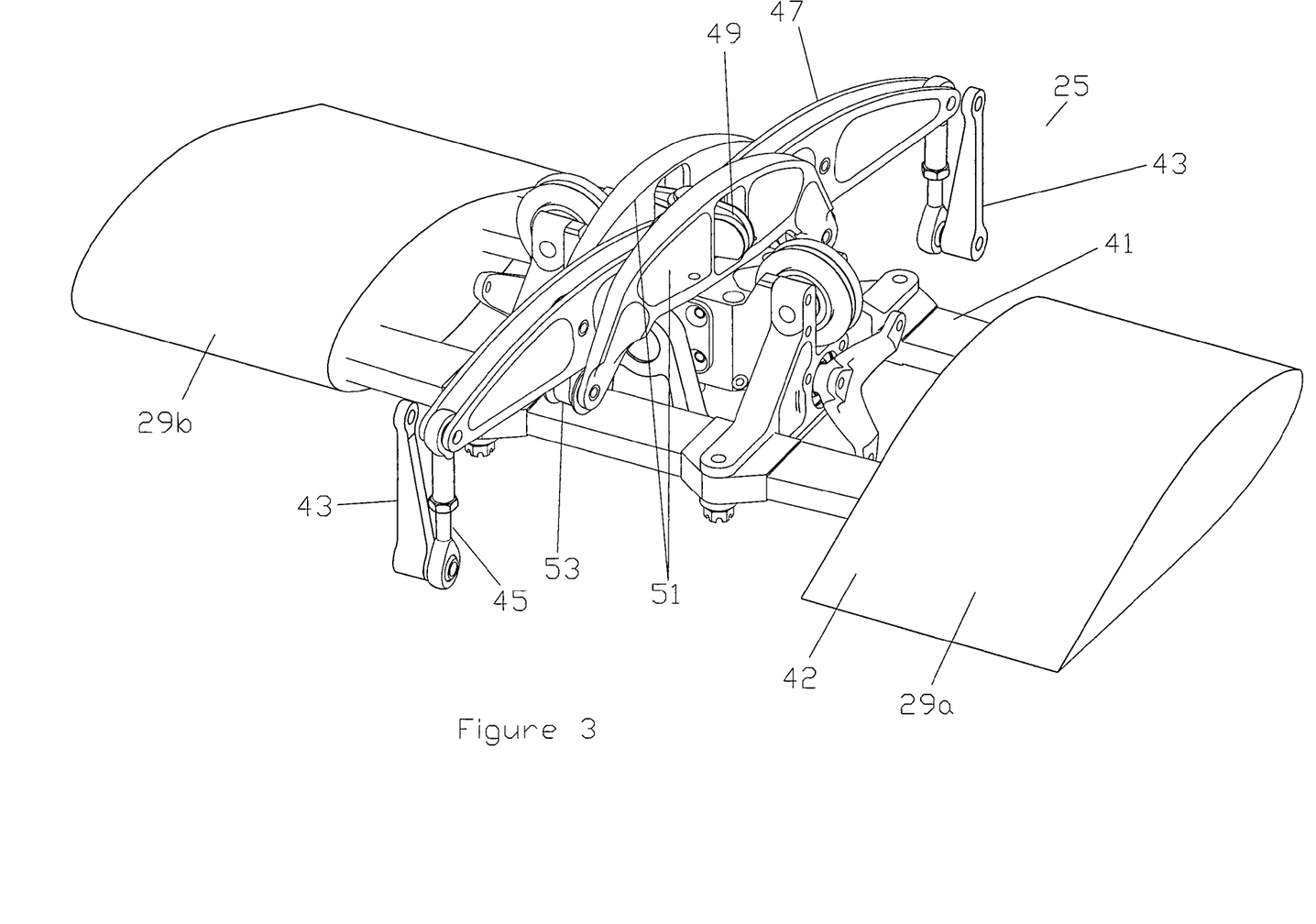
FIG. 3 is a partial perspective view illustrating components of the collective pitch assembly of the aircraft of FIG. 1.

FIG. 3 illustrates the components of one embodiment of the collective pitch assembly. Blades 29 preferably have two spar caps 41 that extend within a shell 42. Spar caps 41 are made up preferably of unidirectional high strength fibers in a composite matrix, and each extends from near the tip of blade 29a to near the tip of blade 29b. Spar caps 41 join each other toward the tips of blades 29, but separate in the central or hub region. Preferably each shell 42 is integrally joined to one of the hub half portions 35 (FIG. 1). A pitch horn 43 is secured to each shell 42 of each blade 29. Each pitch horn 43 can be located either forward or aft of the pitch axis, but as shown in located forward of pitch axis 39 (FIG. 2). When moved up and down, each pitch horn 43 will twist shell 42 relative to spar caps 41 in the central region. The twisting blade shells 42 cause the change in pitch about pitch axis 39 (FIG. 2).

Each pitch horn 43 is pivotally connected to a pitch link 45, which in turn is connected to a pitch link arm 47. Pitch link arm 47 is pivotally mounted to a cross arm 49 that is located on piston rod 55 shown in FIG. 4. Cross arm 49 is able to reciprocate up and down relative to support 51. Links 53 are mounted between support 51 at a mid-point along each pitch link arm 47. When cross arm 49 moves downward, links 53 serve as fulcrums to cause pitch links 45 and pitch horns 43 to move upward in unison. Similarly, when cross arm 49 moves upward relative to support 51, pitch horns 43 move downward in unison. Cross arm 49 is attached to a piston rod 55 that is raised and lowered using hydraulic cylinder 65.

Figure 4:
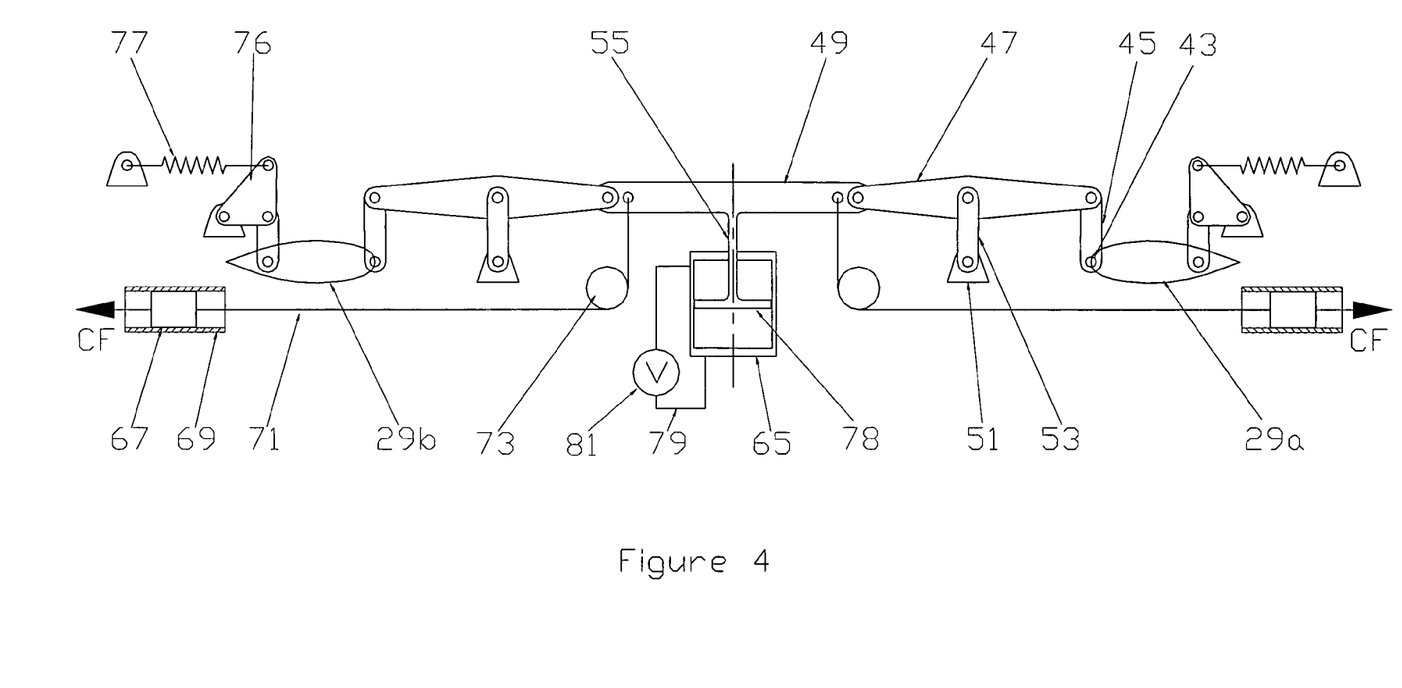
FIG. 4 is a schematic view of an automatic pitch controller for the collective pitch assembly shown in FIG. 3.

Referring to FIG. 4, a collective weight 67 is carried by each blade 29 for lengthwise movement along blade 29. Collective weight 67 is preferably carried on or by a slide 69, which is illustrated to be a tube, but it could be other types of support structure. Centrifugal force due to the rotation of blades 29 will force collective weights 67 to slide outward on slides 69. A linkage, such as cable 71, attaches to the inner end of each collective weight 67. Each cable 71 extends inward from one of the collective weights 67 around a guide member, such as pulley 73, and up to cross arm 49. As weights 67 move outward, they pull cables 71, and thus cross arm 49 and piston rod 55 downward. Other guide devices, such as cam mechanisms, may be employed instead of pulleys 73 for causing the downward movement of cross arm 49 in response to an outward pull on cables 71. Pulley 73 simply turns the direction of force of cable 71 from outward to downward, thus it is considered to be a linear responsive guide member. If cable 71 were connected to a guide member that is a cam mechanism such as a bell crank, which in turn is connected to cross arm 49, the response could be tailored to be non linear, if desired. That is, the downward movement of cross arm 49 could move non linearly relative to the outward and inward movement of cables 71, if such were utilized.

Preferably, weights 67 are biased to an inward position by springs 77. In this embodiment, each spring 77 is connected to one of the blades 29 through a bell crank 76 to provide a means of tailoring the reaction force to a desired nonlinear response. Each spring 77 exerts a twisting force on one of the blades 29 about the pitch axis 39 (FIG. 2) that is opposite to the force exerted by cables 71 when collective weights 67 move outward. The force or moment created by spring 77 and bell crank 76 can be varied nonlinearly with collective pitch changes. Without bell crank 76, spring 77 would exert a force in reaction to the outward pull by collective weights that is linear with the forces exerted by collective weights 67. Bell crank 76, however, has two pivot points that are selected so that the force exerted by spring 77 is nonlinear relative to the outward pull by collective weights. Devices other than bell cranks, such as cams, can cooperate with spring 77 to create a desired non linear response. Bell crank 76 is considered herein to be a type of a cam mechanism. When collective weights 67 move outward, they cause cross arm 49, piston rod 55, and piston 78 to move downward. The downward movement of cross arm 49, piston rod 55 and piston 78 causes pitch horns 43 to move upward, increasing the collective pitch of blades 29.

Referring still to FIG. 4, hydraulic cylinder 65 includes a piston 78 contained therein. Piston 78 defines an upper chamber and a lower chamber in cylinder 65 containing a hydraulic fluid that resists movement of piston 78. When piston 78 cannot move, piston rod 55 and cross arm 49 cannot move, and thus no change can be made to the collective pitch of blades 29. A bypass line 79 extends around piston 78 from the upper chamber to the lower chamber in hydraulic cylinder 65. Bypass line 79 allows fluid to flow from one chamber to the other to enable piston 78, piston rod 55 and cross arm 49 to move linearly. A valve 81 selectively closes bypass line 79 to lock out the automatic pitch control mechanism. Bypass line 79 has an orifice sized to limit the flow rate of hydraulic fluid and thus control the speed of movement of piston 78, piston rod 55 and cross arm 49.

Blades 29 are biased to a zero collective pitch position due to springs 77 (FIG. 4). Also, when rotor 25 rotates, centrifugal force is created that tends to flatten any pitch in blades 29 (FIG. 1) or twist in the spar caps 41 (FIG. 3) to a zero collective position. Further, the location of the tip weights 31 (FIG. 1) forward of blade leading edges 33 creates moments tending to urge blades 29 to a zero collective pitch position. In addition, the aerodynamic center of lift of each blade 29 is aft of blade pitch axis 39 (FIG. 2), which urges blades 29 to the zero collective pitch position during rotation. The rotor lift varies from 100% of the gross weight at liftoff to possibly 10% or less of the gross weight at cruise altitude. These various forces create a non linear moment relative to blade pitch.

The collective weights 67, springs 77 and bell crank or cam mechanisms 76 are tailored to counter these various moments to produce a selected blade pitch versus RPM for the gyroplane 11 of FIG. 1. Also, non linear cam mechanisms could also be substituted for pulleys 73, if desired. The collective weights 67 increase the pitch as the rotational speed of rotor 25 increases, and as the rotational speed of rotor 25 decreases, the various moments described above overcome the centrifugal forces on collective weights 67 and decrease the pitch. The rate of increase and decrease of these moments provides blade pitch stability and keeps blade flapping within a desired range.

Figure 5:
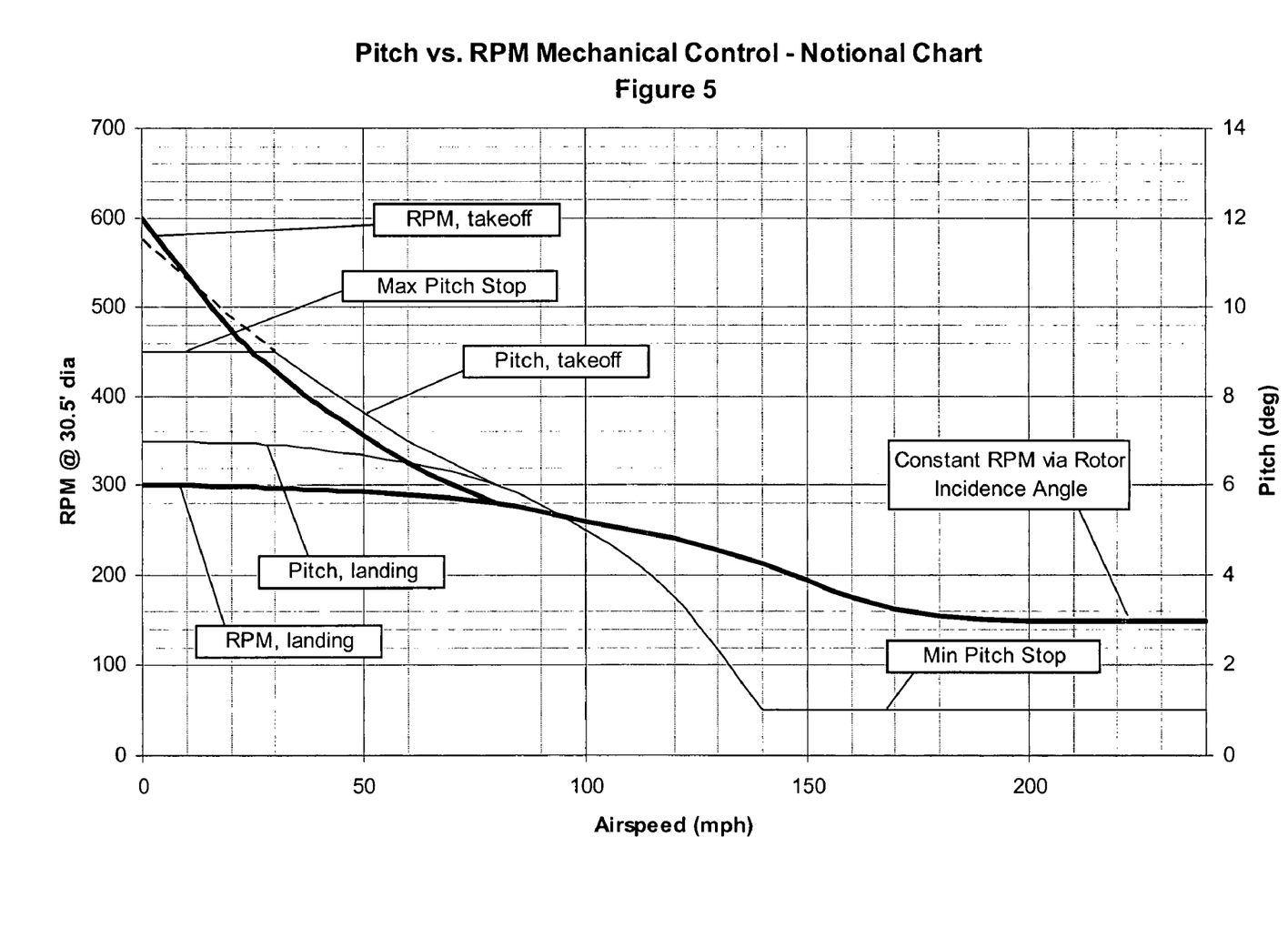
FIG. 5 is a graph illustrating the relationship between collective pitch and rotor RPM versus air speed.

In operation, for takeoff, the pilot will pre-rotate rotor 25 (FIG. 1) to an over-speed such as 650 RPM or a tip speed of about Mach 0.8. To keep rotor 25 from producing lift during the spin-up, rotor 25 and propeller 37 (FIG. 1) are maintained at near zero collective pitch during pre-rotation. Valve 81 (FIG. 3) is closed, blocking any movement of piston 78 in cylinder 65. Piston rod 55 and cross arm 49 are thus held in a near zero collective position. The collective pitch of propeller 37 (FIG. 1) can be maintained near zero by a similar arrangement or by a manual arrangement while valve 81 is closed. The graph is FIG. 5 illustrates the pre-rotation as being at zero collective pitch. The over-speed rotation stores kinetic energy for a jump takeoff.

Once rotor 25 is up to the desired over-speed, and the clutch driving rotor 25 is disconnected from the engine, valve 81 is opened. This allows all of the horsepower to now drive propeller 37 (FIG. 1). The centrifugal force on collective weights 67 causes piston rod 55 and cross arm 49 to move downward as weights 67 move outward. As shown in FIG. 5, the pitch will increase to a first level, such as around 6 degrees, at which aircraft 11 begins to lift. The pitch then increases more gradually up to a maximum, between 9 and 12 degrees, as aircraft 11 lifts and advances forward. Meanwhile, the RPM of rotor 25 will be decreasing because it is no longer driven by the engine, but rather from the stored up inertia in the rotor blades. Initially at liftoff, rotor 25 may be tilted slightly forward so the rotor lift will have a forward component to help accelerate the aircraft and then as the RPM slows the rotor will be tilted aft as required to provide the required lift. Tilting rotor 25 aft causes air to flow through the rotor from the lower side, which now provides the required rotor autorotation driving force. As the aircraft accelerates, wing 21 provides more of the lift, allowing the rotor lift to decrease. To reduce the net lift, required to keep from climbing, the pilot tilts rotor 25 forward so less air flows through the rotor, which decreases its RPM and lift.

As shown in FIG. 5, in this embodiment, the aircraft velocity reaches a point after which the rotor RPM and the collective pitch decrease relative to an increase in aircraft velocity. In this example, the rotor RPM and blade collective pitch decrease as the aircraft speed increases from around 30 mph to about 150 mph, although it is not essential that the relation of rotor RPM and blade collective pitch be linear relative to aircraft speed. As discussed above, the collective pitch will decrease due to the various moments around pitch axis 39 (FIG. 2) tending to flatten blades 29, and the centrifugal forces on collective weights 67 will control the rate at which the pitch changes. As the pitch decreases, cross arm 49 and piston rod 55 move upward with piston 78. The upward movement of cross arm 49 pulls cables 71, causing inward movement of collective weights 67. Springs 77 and bell crank/cam 76 apply additional forces to urge collective weights 67 inward. Eventually at a speed shown in the example of about 150 mph, when the rotor advance ratio is greater than about 0.7, the collective pitch will be at a given design pitch between 1.5 and minus 0.5 degrees and will remain constant as the aircraft speed increases. The pilot maintains the RPM of rotor 25 at a selected minimum level by controlling the tilt of rotor 25. The given minimum pitch is selected to assure rotor flapping is always at an acceptable level, and if the rotor RPM should drop below its desired RPM, tilting rotor 25 aft slightly will increase its RPM.

For landings, the operator will tilt rotor 25 aft, which causes more air to flow through rotor 25, increasing the speed of rotation. The increase in speed of rotation causes collective weights 67 (FIG. 4) to move outward due to the increase in centrifugal force. The centrifugal force overcomes the non linear force of springs 77 through bell crank/cam mechanism 76, which causes a downward movement of piston rod 55 and cross arm 49. This downward movement pulls pitch horns 43 upward, increasing the pitch gradually as the rotor RPM increases. The aircraft speed will slow as rotor 25 provides more of the lift and wings 21 less. The high collective pitch enables a vertical descent of aircraft 11 at about the same speed as an equivalent diameter parachute of which a high energy absorbing landing gear can safely absorb. Soft landings can be performed using a slow speed approach followed with a landing flare.

The invention has significant advantages. The collective pitch controller is a simple mechanical device that will vary the pitch depending upon the speed of rotation of the rotor and does not require pilot skill to safely operate. The lockout mechanism allows the rotor to be pre-rotated to an over-speed while at a zero collective pitch. Automatically controlling rotor blade pitch relative to rotor RPM also controls flapping of the blades.

While the invention has been shown in only one of its forms, it should be apparent to those skilled in the art that it is not so limited but susceptible to various changes without departing from the scope of the invention.

The invention claimed is:

1. An autogyro rotor aircraft, comprising:
   a fuselage;
   a power source mounted to the fuselage;
   a thrust device coupled to the power source for providing forward thrust to the aircraft;
   a rotor mounted above the fuselage for providing lift during takeoff and landing, the rotor having blades extending outward from a hub, each of the blades being twistable about a pitch axis to vary a collective pitch from a minimum pitch to a maximum pitch, the rotor being operatively connected to the power source for rotation only prior to take-off and freewheeling after take-off;
   a collective pitch assembly mounted to the rotor that moves in an advancing direction to increase the collective pitch and in a decreasing direction to decrease the collective pitch;
   a mechanical pitch controller operatively coupled to the collective pitch assembly for automatically increasing and decreasing the collective pitch in a selected relationship to the rotational speed of the rotor while freewheeling;
   a lockout member cooperatively engaged with the pitch controller and having a locked position that prevents movement of the collective pitch assembly from the minimum pitch while the aircraft is on the ground and the rotor is being prerotated by the power source prior to its takeoff RPM, the lockout member being releasable to allow the collective pitch assembly to move in the advancing direction toward the maximum pitch in response to disengagement of the power source from the rotor; and
   wherein the pitch controller is free to increase and decrease the pitch between the minimum and the maximum pitches continuously while the rotor is autorotating after take-off for a duration of the flight.

2. The aircraft according to claim 1, wherein the pitch controller comprises:
   a pitch increasing mechanism that is coupled to the collective pitch assembly for providing a force that increases the collective pitch in a given relationship to an increase in rotational speed of the rotor while freewheeling;
   a spring; and
   a cam mechanism, the spring and cam mechanism being coupled to the collective pitch assembly to urge the collective pitch assembly to decrease the collective pitch, the spring and the cam mechanism, creating a non linear response in opposition to the force provided by the pitch increasing mechanism.

3. The aircraft according to claim 1, wherein the lockout member comprises:
   a piston and cylinder cooperatively engaged with the collective pitch assembly and the pitch controller, defining a chamber containing a fluid that while closed resists relative movement between the piston and cylinder, which prevents movement of the collective pitch assembly in the advancing direction;
   a passage extending from the chamber to enable the fluid to flow from the chamber and the piston and cylinder to move relative to each other to allow movement of the collective pitch assembly in the advancing direction in response to increasing freewheeling rotational speed of the rotor and in the decreasing direction to the minimum pitch in response to decreasing rotational speed of the rotor; and
   a valve having a closed position that closes the passage to prevent movement of the collective pitch assembly from the minimum pitch while the power source is driving the rotor during pre-rotation, the valve being movable to an open position to allow movement of the collective pitch assembly between the minimum and maximum pitches after the power source ceases to drive the rotor.

4. The aircraft according to claim 1, wherein the lockout member comprises:
   a piston and cylinder cooperatively engaged with the collective pitch assembly and the pitch controller, defining first and second chambers on opposite sides of the piston, the chambers containing a fluid that resists movement of the piston and cylinder relative to each other, which prevents the collective pitch assembly from moving in the advancing and decreasing directions while the chambers are closed;
   a bypass passage extending between the first and second chambers to enable the fluid to flow around the piston between the chambers and allow relative movement of the piston and cylinder and movement of the collective pitch assembly in the advancing and decreasing directions; and
   a valve having an open position opening the bypass passage and a closed position closing the bypass passage to prevent movement of the collective pitch assembly, the valve being in the closed position while the power source is pre-rotating the rotor and being movable to the open position to allow movement of the collective pitch assembly between the minimum and maximum pitches after the engine disengages from the power source.

5. The aircraft according to claim 1, wherein the pitch controller comprises:
   a plurality of weights carried by blades of the rotor near the tips of the blades for outward movement along the blades in response to centrifugal force occurring as the rotor is freewheeling; and
   a plurality of linkage assemblies, each of the linkage assemblies connected between one of the weights and the collective pitch assembly for moving the collective pitch assembly in the advancing direction as the weights move outward.

6. The aircraft according to claim 5, further comprising:
   a spring; and
   a cam mechanism, the spring and cam mechanism being coupled to the collective pitch assembly to urge the collective pitch assembly to decrease the collective pitch and for creating a non linear response in opposition to outward movement of the weights.

7. The aircraft according to claim 1, wherein the pitch controller comprises:
   a slide mounted to and extending lengthwise on each of the blades near a tip of each the blades;
   a weight slidably carried on each of the slides for outward movement in response to centrifugal force occurring as the blade is freewheeling;
   a link extending from each of the weights; and
   a guide member operatively coupled between the link and the collective pitch assembly for moving the collective pitch assembly in the advancing direction as the weights move outward.

8. An autogyro rotor aircraft, comprising:
   a fuselage;
   a thrust device mounted to the fuselage for providing forward thrust to the aircraft;
   a rotor mounted above the fuselage;
   a power source coupled to the thrust device for powering the thrust device, the power source being releasably coupled to the rotor for pre-rotating the rotor prior to liftoff and disengaging rotation of the rotor immediately before liftoff;
   the rotor having blades extending outward from a hub, each of the blades being twistable about a pitch axis to vary a collective pitch;
   a collective pitch shaft coaxial with the rotor that moves in an axial advancing direction to increase the collective pitch and in axial decreasing direction to decrease the collective pitch;
   a plurality of weights, each of the weights being mounted to one of the blades for outward movement along each blade in response to an increase in centrifugal force while the rotor is rotating after liftoff;
   a spring operatively engaged with the weights for causing the weights to move inward in response to a decrease in centrifugal force while the rotator is rotating after liftoff;
   a plurality of cables, each having one end connected to one of the weights and another end extending around a guide member and connected to the collective pitch shaft for moving the collective pitch shaft in the advancing direction in response to outward movement of the weights and the decreasing direction in response to inward movement of the weights;
   a piston and cylinder cooperatively engaged with the collective pitch shaft, defining first and second chambers on opposite sides of the piston for containing a fluid that resists relative movement between the piston and the cylinder while the chambers are closed, which prevents movement of the collective pitch shaft in the advancing and decreasing directions;
   a bypass passage extending between the first and second chambers to enable the fluid to flow between the chambers and allow relative movement between the piston and the cylinder, which allows movement of the collective pitch shaft in the advancing and decreasing directions;
   a valve that is in a closed position closing the bypass passage only during pre-rotation of the rotor to prevent movement of the collective pitch shaft from a minimum pitch position and is movable to an open position opening the bypass passage when the power source disengages from the rotor; and
   wherein the valve remains in an open position after takeoff for the duration of the flight and the weights are free to continuously move between fully inward and fully outward positions, which moves the collective pitch shaft between the minimum pitch and a maximum pitch during the flight in response to changes in the rotational speed of the rotor.

9. The aircraft according to claim 8, further comprising:
a cam mechanism, the cam mechanism and the spring being operatively coupled to the collective pitch shaft for creating a non linear response in opposition to the outward movement of the weights.

10. The aircraft according to claim 8, further comprising a slide mounted to each blade of the rotor, each of the weights being movably carried by one of the slides for inward and outward movement along one of the blades.

11. A method of controlling collective pitch of the blades of an auto gyro rotor aircraft having a power source and a thrust device for applying forward thrust to the aircraft, comprising:

(a) operatively coupling a mechanical collective pitch controller to the rotor that has weights movable along the blades in response to centrifugal force to vary the collective pitch between a minimum level and a maximum level in a selected relationship to the rotational speed of the rotor;

(b) operatively coupling a lockout member with the pitch controller that has a locked position and a released position;

(c) placing the lockout member in the locked position, and with the power source, driving the thrust device and pre-rotating the rotor while with the lockout member, preventing the weights of the collective pitch controller from moving along the blades, so as to retain the collective pitch at the minimum level; then (d) disengaging the power source from the rotor and continuing to drive the thrust device, allowing the rotor to rotate due to inertial to cause lift off, then auto rotate due to air flow; and (e) moving the lockout member to the released position, thereby allowing the weights to move along the blades, causing the pitch controller, to automatically vary the collective pitch between the minimum level and the maximum level in selected relationship to an auto-rotational speed of the rotor after lift off and continuously during the flight.

12. The method according to claim 11, wherein step (e) further comprises:
after lift off and continuously during the flight, exerting a force with the weights of the pitch controller that automatically increases the collective pitch in a given relationship to an increase in rotational speed of the rotor; and
exerting a non linear response on the pitch controller in opposition to said force.

13. The method according to claim 11, wherein step (d) further comprises:
After lift off, decreasing and increasing the auto-rotational speed of the rotor during the flight; and step (c) further comprises:
By movement of the weights along the blades, automatically decreasing and increasing the collective pitch between the minimum level and the maximum level in a given desired relationship to the decrease and increase in auto-rotational speed of the rotor.

\* \* \* \* \*